US012128571B2

(12) United States Patent
Xu et al.

(10) Patent No.: US 12,128,571 B2
(45) Date of Patent: Oct. 29, 2024

(54) 3D COMPUTER-VISION SYSTEM WITH VARIABLE SPATIAL RESOLUTION

(71) Applicant: eBots Inc., Fremont, CA (US)

(72) Inventors: Zheng Xu, Pleasanton, CA (US); Sabarish Kuduwa Sivanath, San Jose, CA (US)

(73) Assignee: eBots Inc., Fremont, CA (US)

( * ) Notice: Subject to any disclaimer, the term of this patent is extended or adjusted under 35 U.S.C. 154(b) by 223 days.

(21) Appl. No.: 17/946,803

(22) Filed: Sep. 16, 2022

(65) Prior Publication Data

US 2023/0123629 A1    Apr. 20, 2023

Related U.S. Application Data

(60) Provisional application No. 63/256,335, filed on Oct. 15, 2021.

(51) Int. Cl.
| | |
|---|---|
| *B25J 9/16* | (2006.01) |
| *B25J 13/08* | (2006.01) |
| *H04N 13/239* | (2018.01) |
| *H04N 13/246* | (2018.01) |
| *H04N 13/25* | (2018.01) |
| *H04N 13/254* | (2018.01) |

(52) U.S. Cl.
CPC .......... *B25J 9/1697* (2013.01); *B25J 9/1602* (2013.01); *B25J 13/08* (2013.01); *H04N 13/239* (2018.05); *H04N 13/246* (2018.05); *H04N 13/25* (2018.05); *H04N 13/254* (2018.05)

(58) Field of Classification Search
CPC ........ B25J 9/1697; B25J 9/1602; B25J 13/08; H04N 13/239; H04N 13/246; H04N 13/25; H04N 13/254; H04N 23/56; H04N 23/90; H04N 23/951; G05B 2219/40604; G05B 2219/40611
See application file for complete search history.

(56) References Cited

U.S. PATENT DOCUMENTS

| | | | |
|---|---|---|---|
| 6,847,392 B1* | 1/2005 | House .................... | G01S 11/12 348/47 |
| 10,122,997 B1* | 11/2018 | Sheffield ............. | H04N 13/296 |
| 2017/0188011 A1* | 6/2017 | Panescu .................. | G06T 7/74 |
| 2017/0193673 A1* | 7/2017 | Heidemann ........... | H04N 13/25 |
| 2020/0404187 A1* | 12/2020 | Iida ...................... | H04N 23/698 |

* cited by examiner

*Primary Examiner* — Jaime Figueroa
*Assistant Examiner* — Sihar A Karwan
(74) *Attorney, Agent, or Firm* — Shun Yao; Yao Legal Services, Inc.

(57) ABSTRACT

One embodiment can provide a robotic system. The robotic system can include a robotic arm comprising an end-effector, a robotic controller configured to control movements of the robotic arm, and a dual-resolution computer-vision system. The dual-resolution computer-vision system can include a low-resolution three-dimensional (3D) camera module and a high-resolution 3D camera module. The low-resolution 3D camera module and the high-resolution 3D camera module can be arranged in such a way that a viewing region of the high-resolution 3D camera module is located inside a viewing region of the low-resolution 3D camera module, thereby allowing the dual-resolution computer-vision system to provide 3D visual information associated with the end-effector in two different resolutions when at least a portion of the end-effector enters the viewing region of the high-resolution camera module.

20 Claims, 7 Drawing Sheets

3D COMPUTER-VISION SYSTEM WITH VARIABLE SPATIAL RESOLUTION

RELATED APPLICATIONS

This claims the benefit of U.S. Provisional Patent Application No. 63/256,335, entitled "3D Computer Vision with Variable Spatial Resolution," by inventors Zheng Xu and Sabarish Kuduwa Sivanath, filed 15 Oct. 2021, the disclosure of which is incorporated herein by reference in its entirety for all purposes.

This disclosure is related to:

U.S. patent application Ser. No. 16/531,899, entitled "A 3D MACHINE-VISION SYSTEM," by inventors Zheng Xu, Kai C. Yung, and MingDu Kang, filed 13 Dec. 2018 and issued 24 Aug. 2021 as U.S. Pat. No. 11,102,459 (hereinafter "U.S. Pat. No. 11,102,459"), which application claims the benefit of U.S. Provisional Patent Application No. 62/718,174, entitled "Method to Improve the Depth of Field (DOF) of Structured Light," filed Aug. 13, 2018; and U.S. Provisional Patent Application No. 62/723,139, entitled "A 3D Machine Vision System," filed Aug. 27, 2018;

U.S. application Ser. No. 17/751,228, entitled "SYSTEM AND METHOD FOR ERROR CORRECTION AND COMPENSATION FOR 3D EYE-TO-HAND COORDINATION," by inventors Sabarish Kuduwa Sivanath and Zheng Xu, filed 23 May 2022, which application claims the benefit of U.S. Provisional Patent Application No. 63/208,816, entitled "SYSTEM AND METHOD FOR CORRECTING AND COMPENSATING ERRORS OF 3D EYE-TO-HAND COORDINATION," by inventors Sabarish Kuduwa Sivanath and Zheng Xu, filed 9 Jun. 2021; and is further related U.S. application Ser. No. 17/751,348, entitled "SYSTEM AND METHOD FOR IMPROVING ACCURACY OF 3D EYE-TO-HAND COORDINATION OF A ROBOTIC SYSTEM," by inventors Zheng Xu, Sabarish Kuduwa Sivanath, and MingDu Kang, filed 23 May 2022, which application claims the benefit of U.S. Provisional Patent Application No. 63/209,933, entitled "SYSTEM AND METHOD FOR IMPROVING ACCURACY OF 3D EYE-TO-HAND COORDINATION OF A ROBOTIC SYSTEM," by inventors Zheng Xu, Sabarish Kuduwa Sivanath, and MingDu Kang, filed 11 Jun. 2021;

the disclosures of which are incorporated herein by references in their entirety for all purposes.

BACKGROUND

Field

This disclosure is generally related to a three-dimensional (3D) computer-vision system for robotic applications. Particularly, this invention relates to a 3D computer-vision system with variable spatial resolutions.

Related Art

Advanced robotic technologies have dramatically changed the way products are produced and led to the fourth industrial revolution (also referred to as Industry 4.0). The fourth industrial revolution improves on the computing and automation technologies developed during the third industrial revolution by allowing computers and robotics to connect and communicate with one another to ultimately make decisions without human involvement. A combination of cyber-physical systems, the Internet of Things (IoT), and the Internet of Systems (IoS) makes Industry 4.0 possible and the smart factory a reality. Smart machines can get smarter as they gain access to more data and learn new skills, which can lead to more efficient and productive and less wasteful factories. Ultimately, a network of digitally connected smart machines that can create and share information will result in the true "lights-out manufacturing" where no human supervision is needed.

One of the critical components in achieving Industry 4.0 is 3D computer vision used to guide the robot to perform various manufacturing tasks, such as manufacturing of consumer electronics (e.g., smartphones, digital cameras, tablet or laptop computers, etc.). The compact design of the consumer electronics means that the assembly tasks often involve the handling of tiny components with high precision. Although high-resolution computer vision with a narrow field of view (FOV) may be suitable for dealing with tiny components, they may be inadequate in dealing with larger components. It is desirable to have a computer-vision system that can provide accurate position information for a wide range of components.

SUMMARY

One embodiment can provide a robotic system. The robotic system can include a robotic arm comprising an end-effector, a robotic controller configured to control movements of the robotic arm, and a dual-resolution computer-vision system. The dual-resolution computer-vision system can include a low-resolution three-dimensional (3D) camera module with a wide field of view (FOV) and a high-resolution 3D camera module. The low-resolution 3D camera module and the high-resolution 3D camera module can be arranged in such a way that an FOV of the high-resolution 3D camera module is located inside an FOV of the low-resolution 3D camera module, thereby allowing the dual-resolution computer-vision system to provide 3D visual information associated with an object grasped by the end-effector in two different resolutions when at least a portion of the object enters the viewing region of the high-resolution camera module.

In a variation on this embodiment, the viewing region of the low-resolution 3D camera module can be at least ten times larger than the viewing region of the high-resolution 3D camera module.

In a variation on this embodiment, the dual-resolution computer-vision system can further include an arc-shaped supporting frame for mounting the low-resolution 3D camera module and the high-resolution 3D camera module.

In a variation on this embodiment, the high-resolution 3D camera module can include a high-resolution structured-light projector and a pair of high-resolution cameras with a fixed focal length.

In a further variation, the high-resolution structured-light projector can include a laser source and a telecentric lens system.

In a variation on this embodiment, the low-resolution 3D camera module can include a wide-angle structured-light projector and one or more wide-angle and low-resolution cameras with a fixed focal length.

In a variation on this embodiment, the system can further include an error-compensation module configured to compensate for pose errors of the robotic arm by determining a controller-desired pose corresponding to a camera-instructed pose of the end-effector such that, when the robotic controller controls the movements of the robotic arm based on the controller-desired pose, the end-effector achieves, as observed by the dual-resolution computer-vision system, the camera-instructed pose.

In a further variation, the error-compensation module can include a machine-learning model configured to output an error matrix that correlates the camera-instructed pose to the controller-desired pose.

In a variation on this embodiment, the system can further include a coordinate-transformation module configured to transform a pose determined by the dual-resolution computer-vision system from a camera-centered coordinate system to a robot-centered coordinate system.

In a further variation, the coordinate-transformation module can be configured to correlate a pose of a component held by the end-effector to a corresponding pose of the end-effector.

One embodiment can provide a computer-implemented method for controlling movements of a robotic arm comprising an end-effector. The method can include determining, based on visual information provided by a low-resolution three-dimensional (3D) camera module, an initial pose of the end-effector or a large component grasped by the end-effector. The low-resolution 3D camera module is part of a dual-resolution computer-vision system comprising the low-resolution 3D camera module and a high-resolution 3D camera module, and the low-resolution 3D camera module and the high-resolution 3D camera module are arranged in such a way that a viewing region of the high-resolution 3D camera module is located inside a viewing region of the low-resolution 3D camera module. The method can further include determining an intermediate pose of the end-effector or the large component based on the initial pose and the viewing region of the high-resolution 3D camera module; controlling movements of the robotic arm to move the end-effector or the large component to the intermediate pose such that a small component held by the end-effector or a small element on the large component enters the viewing region of the high-resolution 3D camera module; determining a pose of the small component or the small element on the large component based on visual information provided by the high-resolution 3D camera module; determining a final pose of the end-effector or the large component based on the pose of the small component or the small element on the large component; and controlling movements of the robotic arm to move the end-effector or the large component to the final pose.

BRIEF DESCRIPTION OF THE FIGURES

In the figures, like reference numerals refer to the same figure elements.

DETAILED DESCRIPTION

Figure 1:
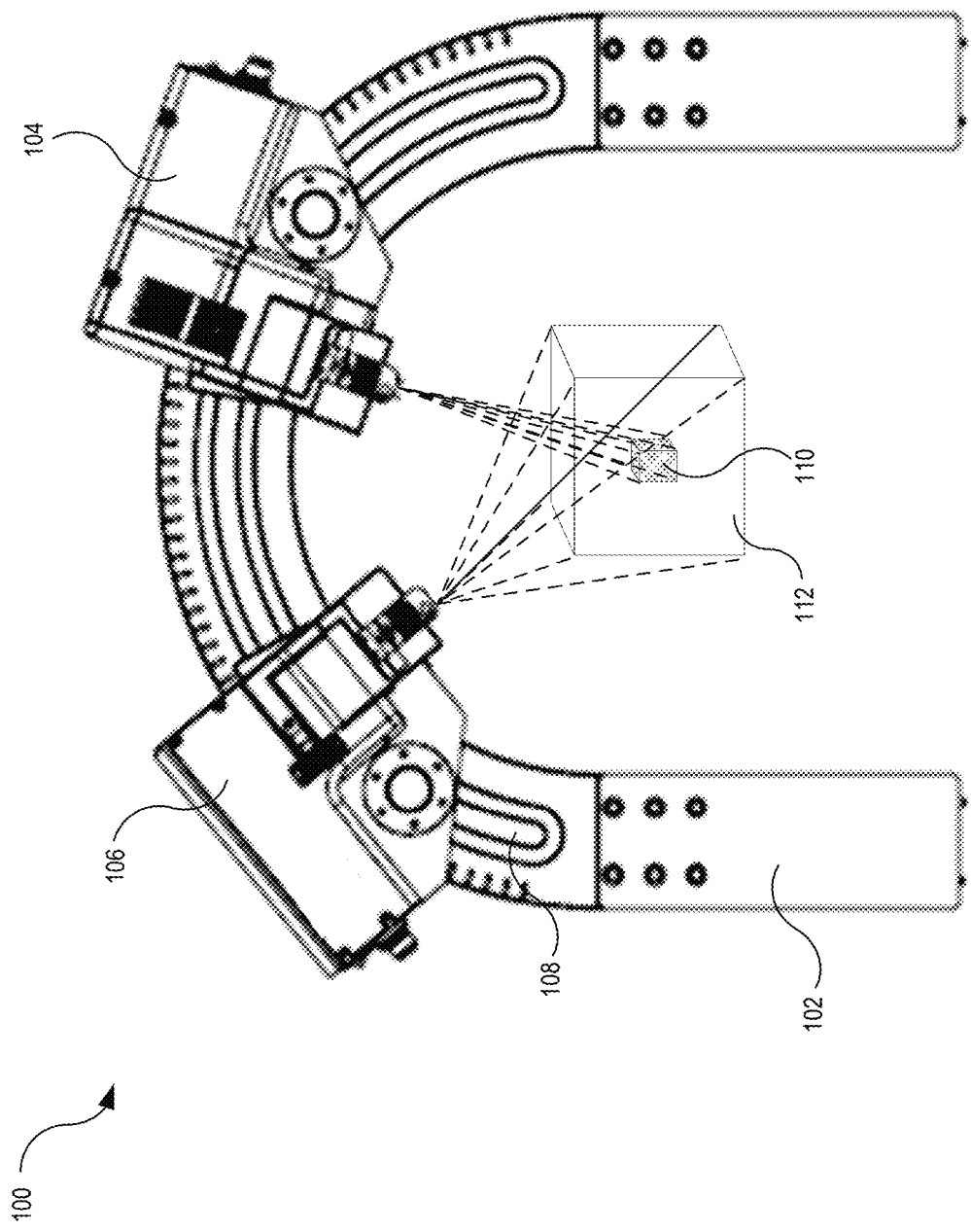
FIG. 1 illustrates an exemplary dual-resolution 3D computer-vision system, according to one embodiment.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of enabling variable spatial resolution of a 3D computer-vision system guiding operations of a robotic arm. More specifically, a dual-resolution 3D computer-vision system is provided. The dual-resolution 3D computer-vision system can include a high-resolution 3D camera module and a low-resolution 3D camera module. Each 3D camera module can include a structured-light projector and one or more cameras. The high-resolution 3D camera module can include a high-intensity structured-light projector with a telecentric lens system and a laser-based light source, whereas the low-resolution 3D camera module can include a low-intensity structured-light projector with a wide-angle lens system and a light-emitting diode (LED)-based light source. The high-resolution 3D camera module can further include a pair of high-resolution cameras, each camera having a smaller field of view (FOV) and a smaller depth of focus (DOF). The low-resolution 3D camera module can include one or more low-resolution cameras, each camera having a larger FOV and a larger DOF. The positions and orientations of the two 3D camera modules can be arranged in such a way that their viewing regions (as defined by the FOV and DOF of each camera module) overlap. During operation, visual information provided by the low-resolution 3D camera module can guide the movements of the robotic arm such that a component grasped by the end-effector is moved into the viewing region of the high-resolution 3D camera. The poses of the end-effector and the component can be determined simultaneously, with the pose of the end effector determined by the low-resolution visual information and the pose of the component determined by the high-resolution visual information. A machine-learning technique can be used to compensate for errors in the transformation matrix or matrices in order to improve the positioning accuracy of the robotic arm.

Dual-Resolution 3D Computer-Vision System

One possible approach to achieve 3D computer vision with a variable resolution is to use a zoom lens with an adjustable focal length. However, although used an essential tool in photography to change the resolution/magnification and the FOV of a camera, a zoom lens is not a practical choice for robotic applications, mostly because the calibration process of a zoom camera can be extremely complicated and time consuming, requiring a tremendous amount of data.

The complexity of calibrating a zoom camera comes from the fact that both intrinsic parameters (i.e., parameters related to the camera's internal characteristics) and extrinsic parameters (i.e., parameters describing the camera's position and orientation) of the camera depend on the zoom, focus, and aperture settings. In contrast, a static camera with a fixed focal length has only one zoom, focus, and aperture setting. Assuming each of the zoom, focus, and aperture settings of a zoom camera has 50 possible values, if calibrating a static camera requires 10 sets of data, then calibrating the zoom camera would require 10×50×50×50=1,250,000 sets of data.

Various techniques have been proposed to reduce the number of calibration data points and at the same time generate a useful zoom camera model. In one example, the intrinsic and extrinsic parameters can be estimated for a constant aperture setting by sampling, at a fixed interval, the required calibration data points. Subsequently, a polynomial of up to five degrees can be used to approximate the camera parameters in a continuous mode for other zoom-focus combinations. In another example, an artificial neural network (ANN) can be used to closely approximate the camera model. These approaches still require more data and cannot achieve the accuracy and resolution required for precision manufacturing.

Compared with a zoom camera, a static camera with a fixed focal length can be easier to calibrate and can provide a higher resolution. To take advantage of these benefits, in some embodiments of the instant application, the 3D computer-vision system can employ two 3D camera modules, with each 3D camera module being a static camera with a fixed focal length. The two 3D camera modules can both provide 3D information of the workspace, with one 3D camera module configured to capture high-resolution 3D images and the other 3D camera module configured to capture low-resolution 3D images. This way, the 3D computer-vision system can provide 3D visual information with two levels of resolution without the need to calibrate the various camera settings (e.g., zoom, focus, and aperture). When the robotic system needs visual guidance to manipulate tiny components (e.g., to plug a cable connector into a matching connector), the robotic system can use the high-resolution 3D images. When the robotic system needs visual guidance to manipulate larger components (e.g., to pick up the entire cable or move the end effector), the robotic system can use the low-resolution 3D images.

In some embodiments, the dual-resolution 3D computer-vision system can include a supporting frame, and the two 3D camera modules can be mounted onto the supporting frame. FIG. 1 illustrates an exemplary dual-resolution 3D computer-vision system, according to one embodiment. Dual-resolution 3D computer-vision system 100 can include a supporting frame 102, a high-resolution 3D camera module 104, and a low-resolution 3D camera module 106, with both 3D camera modules mounted on supporting frame 102. More specifically, supporting frame 102 can include an arc-shaped slot 108 into which the two 3D camera modules (e.g., modules 104 and 106) are mounted. The two 3D camera modules can each slide along slot 108 and can be arranged to have different viewing angles of the workspace. The arc shape of slot 108 (i.e., being a portion of a circle) ensures that the viewing distances (i.e., the distance between the camera modules and the object under observation) of 3D camera modules 104 and 106 are substantially similar, given that the to-be-viewed object is located near the center of the circle. In some embodiments, the angle between the optical axes of the two 3D camera modules can be between 15° and 45°. In alternative embodiments, instead of being mounted onto the same supporting frame, 3D camera modules 104 and 106 can be mounted onto separate supporting structures, and the two 3D camera modules can have different viewing distances.

FIG. 1 shows that high-resolution 3D camera module 104 has a viewing region (also referred to as a high-resolution viewing region) 110, meaning that objects placed within viewing region 110 can be viewed at a predetermined high resolution by high-resolution 3D camera module 104, whereas objects outside viewing region 110 will be out of the focus of high-resolution 3D camera module 104. On the other hand, low-resolution 3D camera module 106 has a viewing region (also referred to as a low-resolution viewing region) 112, which can be much larger than high-resolution viewing region 110. Objects placed within viewing region 112 can be viewed at a predetermined low resolution by low-resolution 3D camera module 106, whereas objects outside viewing region 112 will be out of the focus of low-resolution 3D camera module 106. 3D camera modules 104 and 106 can be arranged in such a way that high-resolution and low-resolution viewing regions 110 and 112 overlap, with high-resolution viewing region 110 located approximately at the center of low-resolution viewing region 112. In one example, the predetermined high resolution of high-resolution 3D camera module 104 can be at least ten times higher than the predetermined low resolution of low-resolution 3D camera module 106.

These two overlapping viewing regions with different resolutions can enable dual-resolution 3D computer-vision system 100 to simultaneously view the workspace in both resolutions, thus making it possible for 3D computer-vision system 100 to provide positioning guidance to a robotic arm at two different resolution levels. More specifically, when the robotic arm is manipulating a relatively large component, it can place the large component in low-resolution viewing region 112; and when the robotic arm is manipulating a relatively small component, it can place the small component in high-resolution viewing region 110. When the robotic arm is manipulating a relatively large component to observe certain detail features on the large component, the area with the detail features can be placed in the high-resolution view region, and the rest of the large component may remain in the low-resolution viewing region. Note that existing robotic systems may sometimes rely on a two-dimensional (2D) camera with a relatively large FOV to scan the workspace to locate a small component and then use a high-resolution 3D camera to obtain 3D visual information of the component. However, this 2D-3D camera combination may be inadequate in certain situations, especially when manipulating a flexible component, such as a cable. This is because depth information is needed in order to accurately locate a flexible component. Moreover, the 2D visual information may not be sufficient in determining the pose of the end-effector or a component held by the end-effector.

Figure 2:
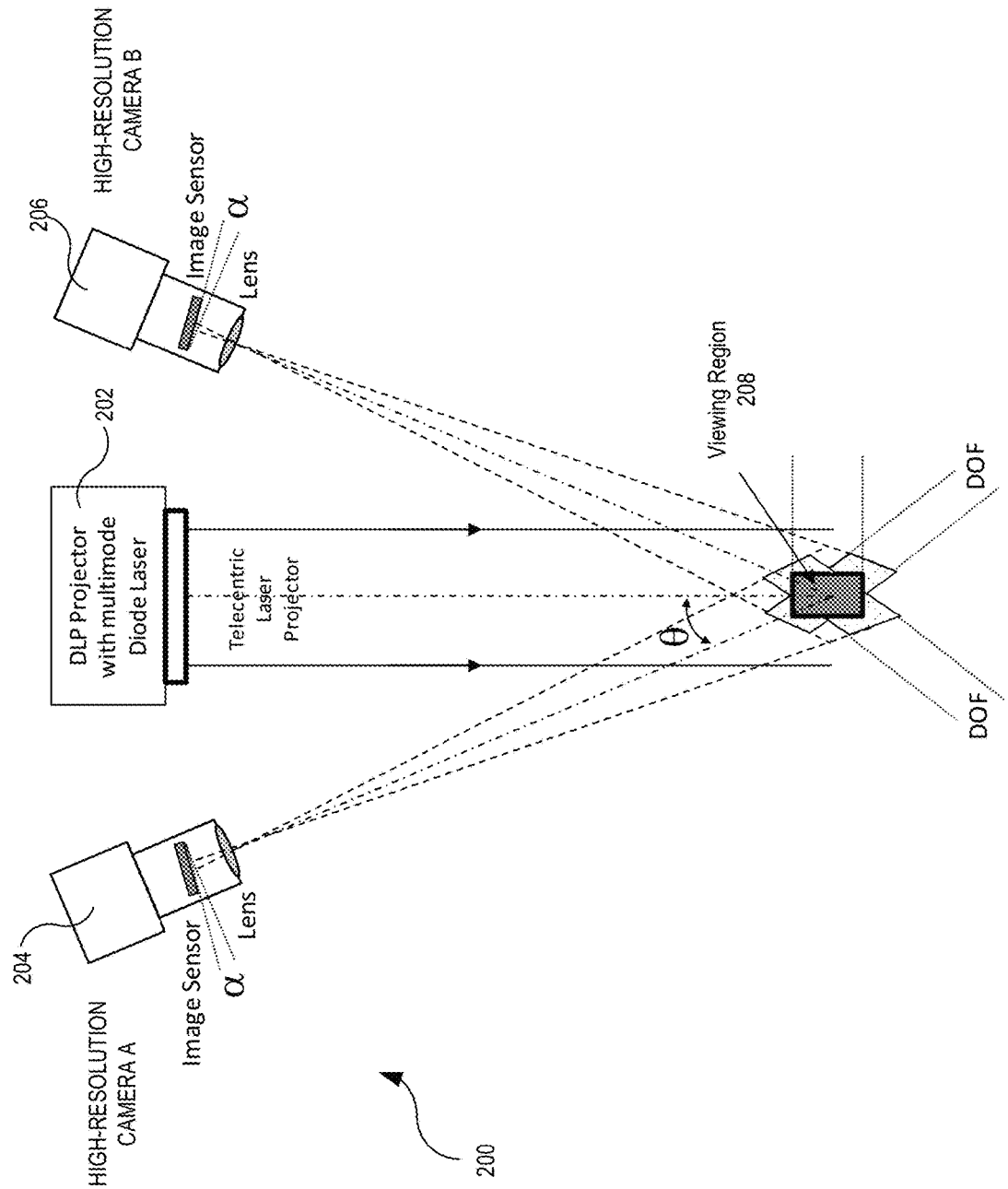
FIG. 2 illustrates an exemplary high-resolution 3D camera module, according to one embodiment.

FIG. 2 illustrates an exemplary high-resolution 3D camera module, according to one embodiment. High-resolution 3D camera module 200 can include a high-resolution structured-light projector 202 and a pair of high-resolution cameras 204 and 206. More specifically, high-resolution structured-light projector 202 can include a Digital Light Processing (DLP) projector, which can project high-resolution codified images (e.g., light patterns) at a high frame rate. In some embodiments, high-resolution structured-light projector 202 can include a light source based on a multimode laser and a beam expander based on a double-telecentric lens system to project a high-intensity parallel beam onto an object in viewing region 208. The speed of high-resolution structured-light projector 202 can be between 10 and 20 frames per second or higher (e.g., up to 2500 frames per second).

In some embodiments, the image resolution of high-resolution cameras 204 and 206 can be sub-millimeter (e.g., less than 50 microns) to provide detailed visual information of tiny components in their view. High-resolution cameras 204 and 206 can be positioned on opposite sides of high-resolution structured-light projector 202 to mitigate the negative effects caused by occlusion and specular reflection. Each high-resolution camera can include a lens and an image sensor. In some embodiments, each camera can have a tilted image sensor (i.e., the image sensor is tilted with respect to the lens such that the image plane is not parallel to the lens plane). This arrangement can increase the effective depth of field (DOF) of the cameras. A more detailed description of the high-resolution camera module can be found in U.S. patent application Ser. No. 16/531,899, entitled "A 3D MACHINE-VISION SYSTEM," by inventors Zheng Xu, Kai C. Yung, and MingDu Kang, filed 13 Dec. 2018 and issued 24 Aug. 2021 as U.S. Pat. No. 11,102,459 (hereinafter "U.S. Pat. No. 11,102,459"), the disclosure of which is incorporated herein by reference.

Figure 3:
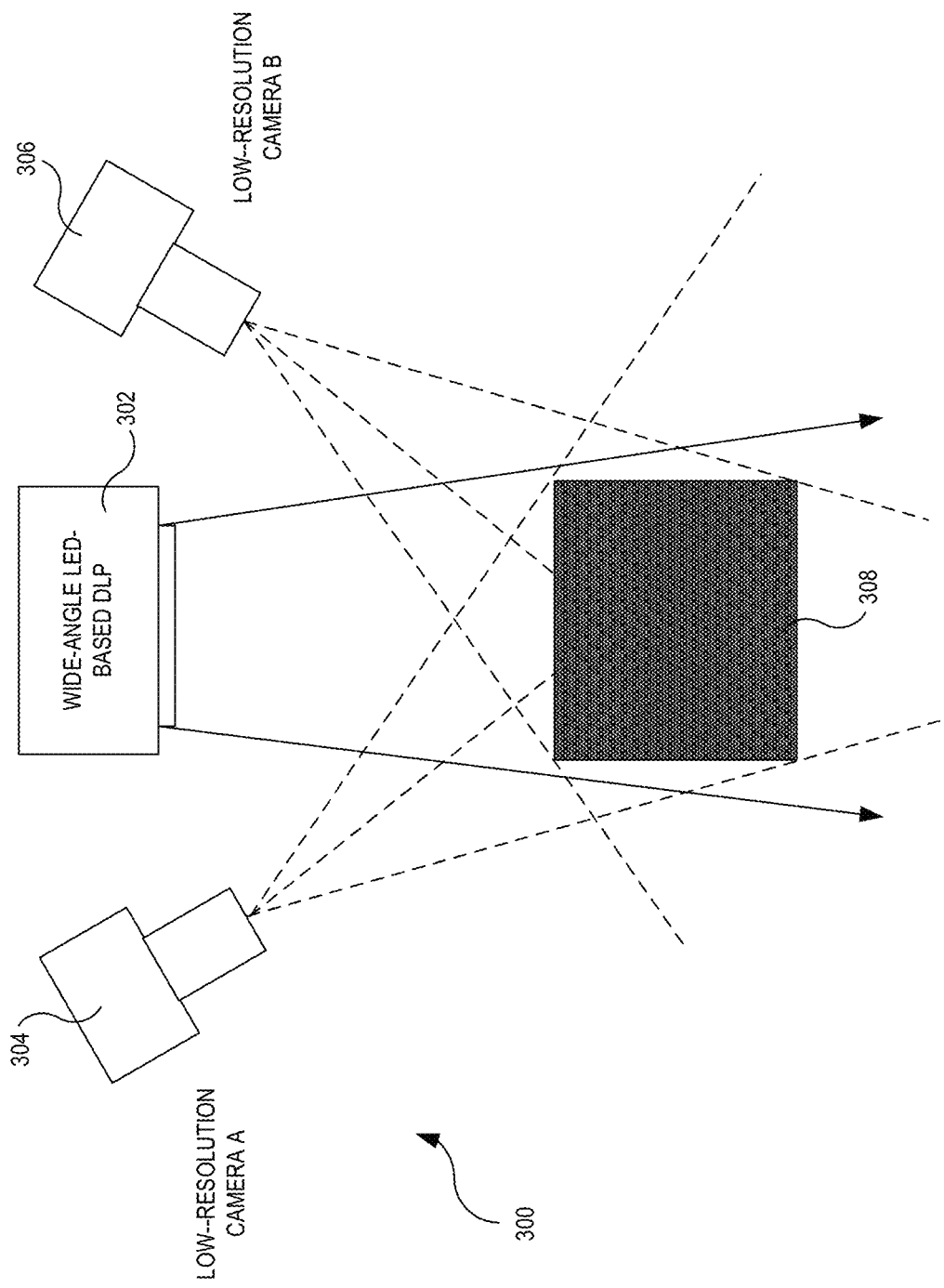
FIG. 3 illustrates an exemplary low-resolution 3D camera module, according to one embodiment.

FIG. 3 illustrates an exemplary low-resolution 3D camera module, according to one embodiment. Low-resolution camera module 300 can include a wide-angle low-resolution structured-light projector 302 and a pair of wide-angle low-resolution cameras 304 and 306. More specifically, low-resolution structured-light projector 302 can include a wide-angle LED-based DLP projector, which can project a low-intensity wide-angle beam onto an object in viewing region 308. The projected beam spot of low-resolution structured-light projector 302 can be much larger than that of high-resolution structured-light projector 202 shown in FIG. 2. Similarly, the FOV and DOV of low-resolution cameras 304 and 306 can be much larger, respectively, than the FOV and DOV of high-resolution cameras 204 and 206 shown in FIG. 2. Consequently, viewing region 308 of low-resolution camera module 300 can have a much larger volume than viewing region 208 of high-resolution camera module 200. Depending on the settings of the cameras, in some embodiments, the volume of low-resolution viewing region 308 can be at least ten times larger than the volume of high-resolution viewing region 208. The high-resolution images can have a resolution that is at least ten time higher than that of the low-resolution images. In one example, the resolution of the high-resolution images can be approximately 20 microns, whereas the resolution of the low-resolution images can be beyond 200 microns.

Figure 4:
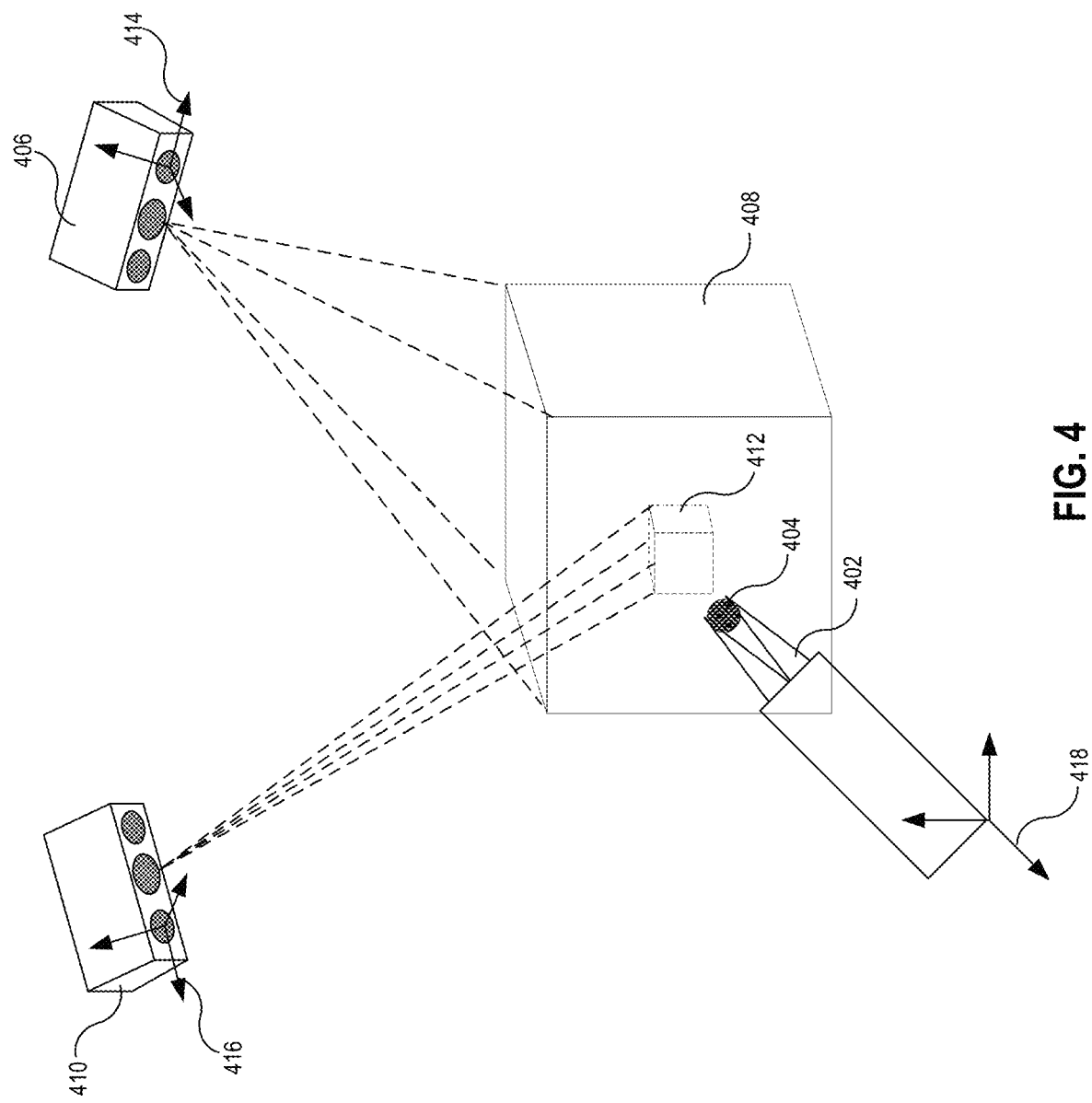
FIG. 4 illustrates an exemplary use scenario of the dual-resolution 3D computer-vision system, according to one embodiment.

FIG. 4 illustrates an exemplary use scenario of the dual-resolution 3D computer-vision system, according to one embodiment. FIG. 4 shows an end-effector 402 of a robotic arm holding a small component 404. FIG. 4 also shows a low-resolution 3D camera module 406 with a larger, low-resolution viewing region 408 and a high-resolution 3D camera module 410 with a smaller, high-resolution viewing region 412. 3D camera modules 406 and 410 can be arranged in such a way that high-resolution viewing region 412 can be located within and approximately at the center of low-resolution viewing region 408. As discussed previously, low-resolution viewing region 408 can be at least ten times larger than high-resolution viewing regions 412.

When end-effector 402 is placed within low-resolution viewing region 408 (as shown in FIG. 4), low-resolution visual information (e.g., images) provided by low-resolution 3D camera module 406 can be used to determine the pose (which can include both the location and orientation) of end-effector 402. Based on the determined pose of end-effector 402 and the known location of high-resolution viewing region 412, an intermediate pose of end-effector 402 can be computed, and the robotic arm can move end-effector 402 to its intermediate pose such that small component 404 along with a portion (e.g., the tip) of end-effector 402 can be moved inside high-resolution viewing region 412. Once small component 404 is inside high-resolution viewing region 412, high-resolution visual information (e.g., images) of small component 404 can be obtained by high-resolution 3D camera module 410 to allow the current pose of small component 404 to be determined. Given the current pose of small component 404 and its desired mounting pose (which can be determined based on the pose of another component onto which small component 404 is to be mounted), the final pose of end-effector 402 can be computed. The robotic arm can then move end-effector 402 to its final pose such that small component 404 can arrive at its desired mounting pose, thus allowing small component 404 to be mounted correctly.

In a different scenario, end-effector 402 may grasp a relatively large component (e.g., a flexible cable that is over 10 cm long). End-effector 402 can move to an initial pose such that the entire large component or a major portion of the large component is in low-resolution region 408, thus allowing low-resolution 3D camera module 406 to obtain low-resolution visual information about the large component. In order to obtain high-resolution information about a small element on the large component (e.g., the connector on the flexible cable), end-effector 402 can be moved to an intermediate pose such that the small element on the large component enters high-resolution viewing region 412, although a major portion of the large component remains in low-resolution viewing region 408. The final pose of end-effector 402 can then be determined based on the viewed pose of the small element on the large component.

Note that each 3D camera module may have its own coordinate system, with the origin of each coordinate system being located on each camera module. In the example shown in FIG. 4, low-resolution camera module 406 has a coordinate system (referred to as low-resolution-camera-coordinate system) 414 that is centered at low-resolution camera module 406, and high-resolution camera module 410 has a coordinate system (referred to as high-resolution-camera-coordinate system) 416 that is centered at high-resolution camera module 410. When the pose of end-effector 402 or component 404 is determined/computed based on visual information provided by a 3D camera module, the pose is often represented using coordinates of the corresponding camera-coordinate system. For example, the pose of end-effector 402 is determined based on visual information provide by low-resolution camera module 406 and can be represented using coordinates of low-resolution-camera-coordinate system 414, whereas the pose of small component 404 is determined based on visual information provide by high-resolution camera module 410 and can be represented using coordinates of high-resolution-camera-coordinate system 416.

The coordinate systems of the two 3D camera modules are used to represent the viewed poses of end-effector 402 and component 404. On the other hand, when controlling the movements of the robotic arm, the robotic controller typically uses a different coordinate system (referred to as the robot-base-coordinate system) 418 with its origin located at the base of the robotic arm. In order for the robotic controller to know where to move the robotic arm, the robotic controller often needs to transform the coordinates from the camera-centered coordinate system (e.g., either low-resolution-camera-coordinate system 414 or high-resolution-camera-coordinate system 416) to the robot-centered coordinate system (i.e., robot-base-coordinate system 418). Such a transformation is referred to as the hand-eye coordination of the robotic system.

The transformation between a camera-coordinate system and the robot-base-coordinate system can be expressed as $\vec{V}_r = {}^b H_c \vec{V}_c$, where ${}^b H_c$ is the transformation matrix, $\vec{V}_r$ is a vector in the robot-base space (i.e., it is represented using coordinates in the robot-base-coordinate system), $\vec{V}_c$ is the vector in the camera space (i.e., it is represented using coordinates in the camera-coordinate system). The transformation matrix can often be obtained using an eye-to-hand calibration process, where a calibration target is attached to the end-effector. By moving the end-effector to a number of planned poses within the viewing region of the camera module and by recording the poses of the calibration target with respect to the camera module (i.e., with respect to the origin of the camera-coordinate system), one can solve for the transformation matrix ${}^c H_r$. Due to the non-linearity of kinematics and the inherent nature of numerical computations, there can be errors in the solution of the transformation matrix. Moreover, input data from the robotic controller and cameras may also include errors, which can cause inevitable errors in the transformation matrix. Errors in the transformation matrix can lead to positioning/pose errors of the robot.

In some embodiments, to improve the positioning accuracy of the robotic system and to correct errors in the transformation matrix in real time, the robotic controller can use an error matrix $E(\vec{r})$ to transform a camera-instructed pose (or instructed pose in short) H of the tool center point (TCP) of the end-effector to a controller-desired pose (or desired pose in short) $H_{td}$, where $H_{td} = E(\vec{r}) \times H_{ti}$. Note that instructed pose $H_{ti}$ is the actual, camera-viewed pose of the TCP of the end-effector converted from the camera space to the robot-base space using the transformation matrix, and desired pose $H_{td}$ is the pose programmed by the controller according to the instructed pose. The two poses should be identical if there is no error in the transformation matrix. However, due to errors in the transformation matrix, when the controller sends commands to move the end-effector TCP to desired pose $H_{td}$, the end-effector TCP actually arrives at instructed pose $H_{ti}$, which may be different from $H_{td}$. Hence, given an instructed pose (i.e., a pose determined by the camera), if error matrix $E(\vec{r})$ is known, one can compute the desired pose that can be used by the controller to send commands to the robotic arm to move the end-effector TCP to the instructed pose, thus achieving the eye (camera)-to-hand (robotic controller) coordination. The controller-desired pose $H_{td}$ can in fact corresponds to the settings of the various motors of the robotic arm.

In some embodiments, the error matrix can be obtained using a machine-learning technique. More specifically, a pre-trained error-detection machine-learning model (which can include a deep-learning neural network) can be used to predict the error matrix corresponding to an instructed pose, which can be determined using visual information provided by a 3D camera module. The desired pose can then be computed by multiplying the error matrix with the instructed pose. The robotic controller can then send commands to the robotic arm according to the desired pose, which can result in the end-effector arriving at the instructed pose.

Because the dual-resolution 3D computer-vision system includes two camera modules, two machine-learning models (e.g., two neural networks) need to be trained, one model for each camera space. More specifically, a first machine-learning model can be trained to predict the error matrix for an instructed pose derived from visual information provided by the low-resolution camera module, and a second machine-learning model can be trained to predict the error matrix for an instructed pose derived from visual information provided by the high-resolution camera module. Detailed description of the process for training an error-detection machine-learning model can be found in U.S. application Ser. No. 17/751,228, entitled "SYSTEM AND METHOD FOR ERROR CORRECTION AND COMPENSATION FOR 3D EYE-TO-HAND COORDINATION," by inventors Sabarish Kuduwa Sivanath and Zheng Xu, filed 23 May 2022, the disclosure of which is incorporated herein by reference.

Figure 5:
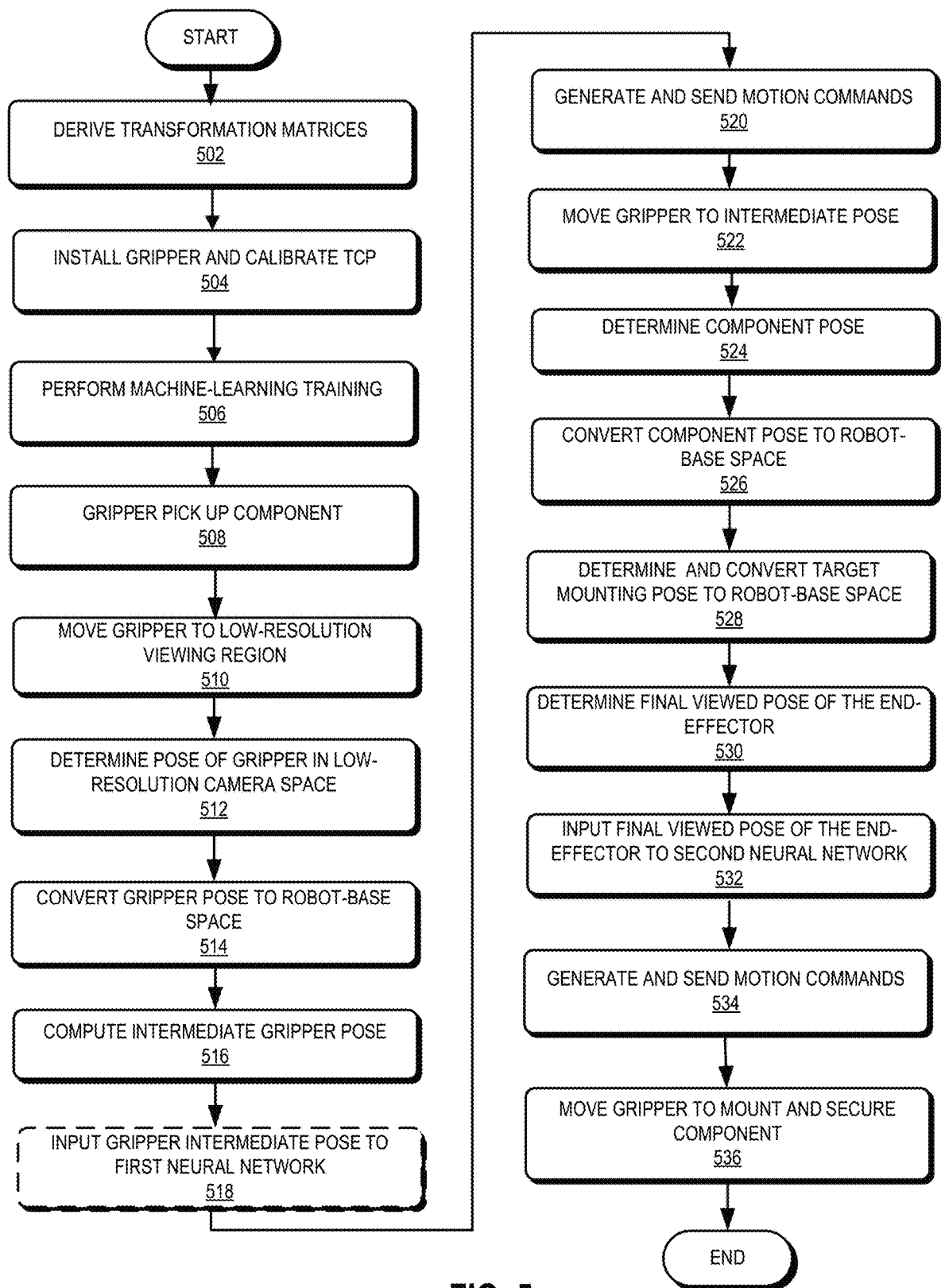
FIG. 5 presents a flowchart illustrating an exemplary operation process of a robotic system implementing the dual-resolution 3D computer-vision system, according to one embodiment.

FIG. 5 presents a flowchart illustrating an exemplary operation process of a robotic system implementing the dual-resolution 3D computer-vision system, according to one embodiment. Prior to performing the assembly tasks, the robotic system needs to be calibrated to derive the transformation matrices for one or both camera modules/spaces (operation 502). Deriving the transformation matrices can involve installing a calibration target on the end-effector of the robotic arm and capturing images of the calibration target by both camera modules when the end-effector moves to different locations in the workspace (or to different locations within the viewing regions of the camera modules). After calibration, the operator can install a gripper on the robotic arm and calibrate its TCP (operation 504). Note that calibrating the TCP refers to the process of determining the coordinates of the TCP with respects to the base of the robot.

Subsequently, the machine-learning training process can be performed (operation 506). In some embodiments, the training process can be performed for both camera modules in the dual-resolution 3D computer-vision system. The training process can include a supervised training process, and the machine-learning models can include deep-learning neural networks. A first neural network can be trained to facilitate the eye-to-hand coordination between the low-resolution camera module and the robotic arm, and a second neural network can be trained to facilitate the eye-to-hand coordination between the high-resolution camera module and the robotic arm. In alternative embodiments, the training can be performed only for the high-resolution 3D camera module. This is because the low-resolution 3D camera module is used to guide the coarse movements of the robotic arm, and small errors in the transformation matrix can be ignored in such situations.

Once the pose-error-detection neural network(s) for the camera module(s) are sufficiently trained, the robotic system can operate with real-time error-correction or error-compensation capability. The gripper can pick up a to-be-assembled component, such as a flexible cable (operation 508). The robotic arm can move the gripper to enter the low-resolution viewing region (operation 510). The dual-resolution 3D computer-vision system can determine the pose of the gripper in the low-resolution camera space based on low-resolution visual information (operation 512). Note that the low-resolution visual information can be provided by a low-resolution 3D camera module, which can be similar to low-resolution 3D camera module 300 shown in FIG. 3.

More specifically, the low-resolution 3D camera module can include a wide-angle LED-based DLP and one or two low-resolution cameras. In one embodiment, the low-resolution 3D camera module can include just one low-resolution camera, which can be sufficient to provide 3D visual information with the assistance of the structured-light projected by the wide-angle LED-based DLP.

The dual-resolution 3D computer-vision system can convert the determined gripper pose from the low-resolution camera space to the robot-base space using a corresponding transformation matrix (operation 514). Note that, although the low-resolution 3D camera module can provide pose information associated with the gripper or a large component grasped by the gripper, it may not be able to provide sufficient details about the pose of a small component or the pose of a portion of the large component. For example, a flexible cable may be over ten centimeters long, whereas its connector may have a dimension of a few millimeters. The low-resolution 3D camera module can provide low-resolution visual information about the flexible cable as a whole but may not be able to provide information about the pose of the cable connector.

Based on the determined gripper pose and the predetermined location of the high-resolution viewing region, the robotic controller can compute an intermediate pose of the gripper (operation 516). The intermediate pose is determined to ensure that the gripper tip or the small component grasped by the gripper can be moved into the high-resolution viewing region. Note that, because both camera modules are static, both the low-resolution and high-resolution viewing regions have fixed locations that are known to the robotic controller. The robotic controller can optionally input the intermediate pose of the gripper to the first neural network to obtain a desired intermediate pose of the gripper (operation 518). This operation can be optional, because the pose of the gripper at this point is not mission critical.

The robotic controller can subsequently generate and send motion commands to the robotic arm based on the intermediate pose or the desired intermediate pose (operation 520) and the robotic arm moves the gripper accordingly to its intermediate pose (operation 522). The dual-resolution 3D computer-vision system can then determine the pose of the component based on high-resolution visual information (operation 524). Note that the high-resolution visual information can be obtained by a high-resolution 3D camera module, which can be similar to high-resolution 3D camera module 200 shown in FIG. 2. More specifically, the high-resolution 3D camera module can include a DLP with a laser source and a telecentric lens system and two high-resolution cameras. In addition to determining the component pose, the intermediate pose of the gripper can also be verified using the low-resolution visual information obtained by the low-resolution 3D camera module. In other words, after the robotic arm moves the component to the high-resolution region, the pose of the end-effector as a whole and the pose of a portion (e.g., the tip) of the end-effector or the component can be determined simultaneously using visual information of different resolutions.

The dual-resolution 3D computer-vision system can convert the determined component pose from the high-resolution camera space to the robot-base space using a corresponding transformation matrix (operation 526). The dual-resolution 3D computer-vision system can also determine, based on the high-resolution visual information, a target mounting pose of the component and then convert the target mounting pose from the high-resolution camera space to the robot-base space (operation 528). Note that the mounting pose of the component can be determined based on the pose of the mounting location (e.g., the pose of a matching cable connector). In some embodiments, an additional transformation matrix (also referred to as a component-transformation matrix $T_c$) can also be determined (e.g., in operation 502). Component-transformation matrix $T_c$ can transform/correlate the pose of a component to the pose of the end-effector such that $H_c = T_c \times H_e$, where $H_c$ is the component pose and $H_e$ the pose of the end-effector, and both poses are in the robot-base space. Given the target mounting pose of the component, the system can use the component-transformation matrix to determine the final viewed or instructed pose of the end-effector (operation 530). The robotic controller can then input the final viewed or instructed pose of the end-effector to the second neural network to obtain a desired final pose of the end-effector or gripper (operation 532).

The robotic controller can subsequently generate and send motion commands to the robotic arm based on the desired final pose of the gripper (operation 534), and the robotic arm can move the gripper accordingly to mount and secure the component (operation 536).

In the example shown in FIG. 5, the gripper is moved from its initial pose to its intermediate pose in one step. It is also possible that the robotic controller moves the gripper from its initial pose to its intermediate pose using multiple smaller steps. Similarly, instead of moving the gripper from its intermediate pose to its final pose in one step, the controller may also move the gripper using multiple smaller steps. Detailed descriptions of dividing a larger movement into a sequence of smaller steps can be found in U.S. application Ser. No. 17/751,348, entitled "SYSTEM AND METHOD FOR IMPROVING ACCURACY OF 3D EYE-TO-HAND COORDINATION OF A ROBOTIC SYSTEM," by inventors Zheng Xu, Sabarish Kuduwa Sivanath, and MingDu Kang, filed 23 May 2022, the disclosure of which is incorporated herein by reference.

Figure 6:
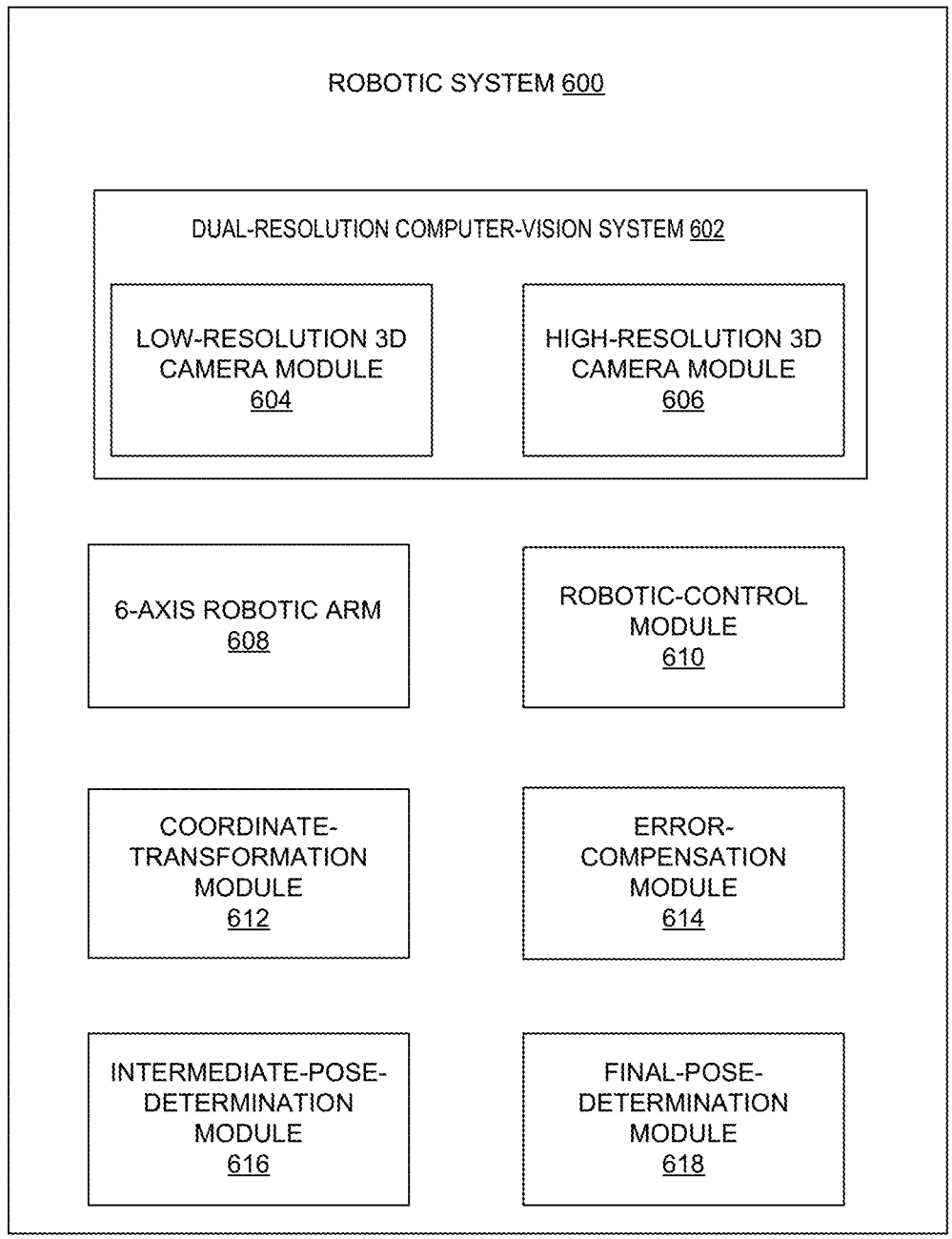
FIG. 6 shows a block diagram of an exemplary robotic system, according to one embodiment.

FIG. 6 shows a block diagram of an exemplary robotic system, according to one embodiment. Robotic system 600 can include a dual-resolution 3D computer-vision system 602, which can include a low-resolution 3D camera module 604 and a high-resolution 3D camera module 606. Robotic system 600 can also include a six-axis robotic arm 608, a robotic-control module 610, a coordinate-transformation module 612, an error-compensation module 614, an intermediate-pose-determination module 616, and a final-pose-determination module 618.

Low-resolution 3D camera module 604 can include a low-resolution structured-light projector and one or two low-resolution cameras. High-resolution 3D camera module 606 can include a high-resolution structured-light projector and a pair of high-resolution cameras. The camera modules can be arranged in such a way that the viewing region of low-resolution 3D camera module 604 encompasses the viewing region of high-resolution 3D camera module 606. Each camera module can include a camera-control module and an image-processing module, which are not shown in FIG. 6. The camera-control module can be responsible for controlling the operations of the cameras and the structured-light projector, and the image-processing module can be responsible for processing the visual information (e.g., images) captured by the cameras.

Six-axis robotic arm 608 can have multiple joints and six degrees of freedom (6 DoF). The end-effector of six-axis robotic arm 608 can move freely in the viewing regions of low-resolution 3D camera module 604 and high-resolution 3D camera module 606. In some embodiments, robotic arm 608 can include multiple sections, with adjacent sections coupled to each other via a rotational joint. Each rotational joint can include a servo motor capable of continuous rotation within a particular plane. The combination of the multiple rotational joints can enable robotic arm 608 to have an extensive range of movement with 6 DoF.

Robotic-control module 610 controls the movements of robotic arm 608. Robotic-control module 610 can generate a motion plan, which can include a sequence of motion commands that can be sent to each individual motor in robotic arm 608 to facilitate the movements of a gripper to accomplish particular assembly tasks, such as picking up a component, moving the component to a desired mounting location, and mounting the component.

Coordinate-transformation module 612 can be responsible for converting the pose of the gripper or component from the camera space(s) to the robot-base space and for converting the pose of the component to the pose of the end-effector. Coordinate-transformation module 612 can maintain a transformation matrix for each of 3D camera module in dual-resolution 3D computer-vision system 602. Coordinate-transformation module 612 can use a transformation matrix to transform a pose seen by a 3D camera module in dual-resolution 3D computer-vision system 602 from the corresponding camera space to a pose in the robot-base space. The transformation matrix can be obtained using a calibration process that measures multiple poses of a calibration target. Coordinate-transformation module 612 can further maintain a component-transformation matrix that correlates the pose of a component and the pose of the end-effector.

Error-compensation module 614 can be responsible for detecting and compensating for errors included in the transformation matrix or matrices. In some embodiments, error-compensation module 614 can apply a machine-learning technique to learn an error matrix that can compensate for the difference between the camera-viewed pose and the controller-desired pose.

Intermediate-pose-determination module 616 can be responsible for determining an intermediate pose of the gripper such that the component grasped by the gripper can be moved from the viewing region of low-resolution 3D camera module 604 into the viewing region of high-resolution 3D camera module 606. Final-pose-determination module 618 can be responsible for determining, based on the high-resolution visual information provided by high-resolution 3D camera module 606, a final pose of the gripper.

Figure 7:
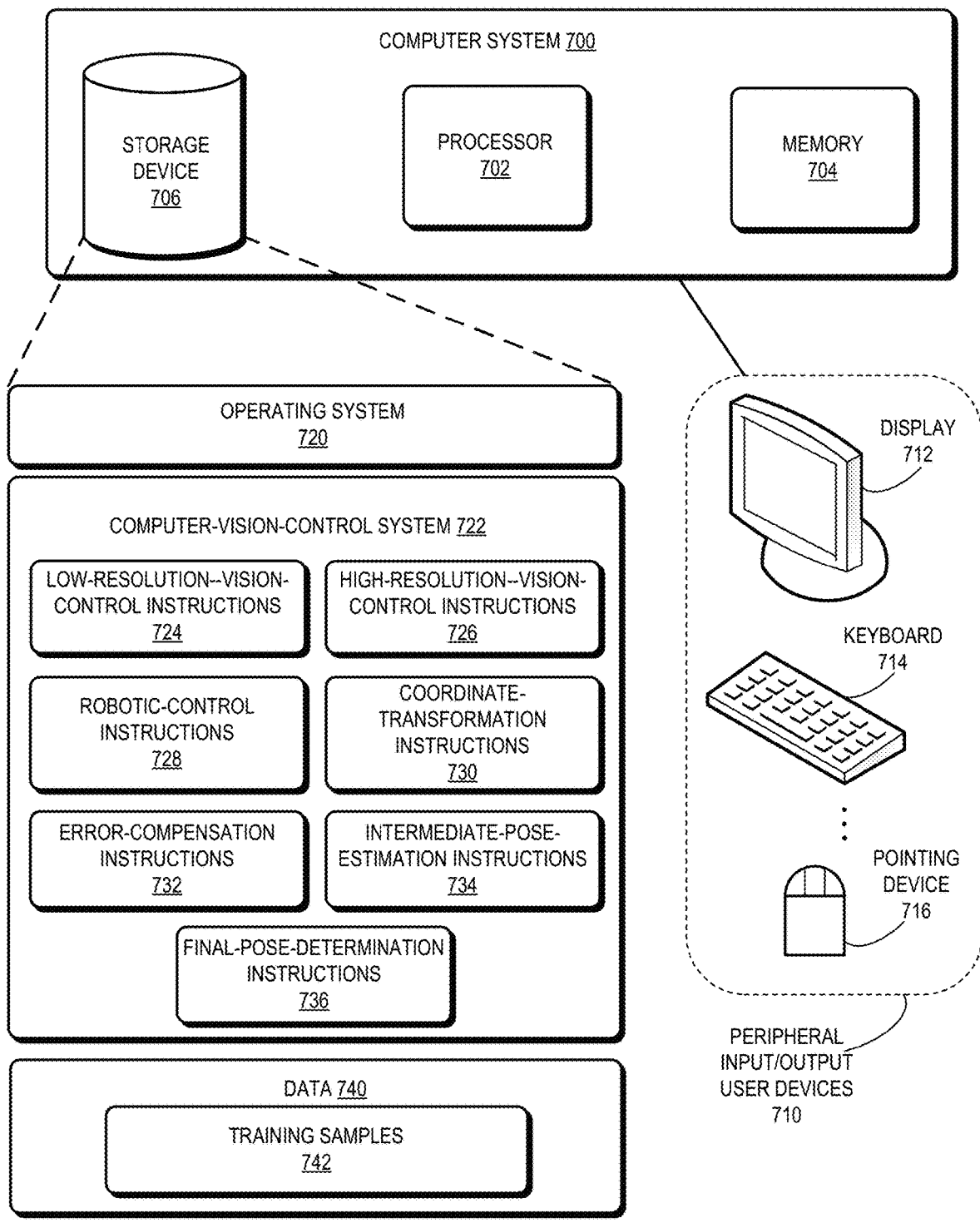
FIG. 7 illustrates an exemplary computer system that facilitates the operation of the dual-resolution computer-vision system, according to one embodiment.

FIG. 7 illustrates an exemplary computer system that facilitates the operation of the dual-resolution computer-vision system, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, a computer-vision-control system 722, and data 740.

Computer-vision-control system 722 can include instructions, which when executed by computer system 700, can cause computer system 700 or processor 702 to perform methods and/or processes described in this disclosure. Specifically, computer-vision-control system 722 can include instructions for controlling a low-resolution 3D camera module to obtain low-resolution visual information (low-resolution-vision-control instructions 724), instructions for controlling a high-resolution 3D camera module to obtain high-resolution visual information (high-resolution-vision-control instructions 726), instructions for controlling movements of the robotic arm (robotic-control instructions 728), instructions for transforming poses from a camera space (the high-resolution camera space or the low-resolution camera space) to the robot-base space (coordinate-transformation instructions 730), instructions for correcting and compensating for errors (e.g., by applying a machine-learning technique) in the transformation matrices (error-compensation instructions 732), instructions for estimating an intermediate pose of the gripper (intermediate-pose-estimation instructions 734), and instructions for determining the final pose of the gripper (final-pose-determination instructions 736). Data 740 can include collected training samples 742.

In general, embodiments of the present invention can provide a system and method for determining and manipulating the pose of the end-effector of a robotic arm. The system can include a dual-resolution computer-vision system that includes a low-resolution 3D camera module as well as a high-resolution 3D camera module. The 3D camera modules can be arranged in such a way that the viewing region of the high-resolution 3D camera module is located within and approximately at the center of the viewing region of the low-resolution 3D camera module. During operation, the end-effector (e.g., a gripper) of the robotic arm can pick up a small component. The pose of the end-effector can be determined using low-resolution information obtained by the low-resolution camera module. Based on the determined end-effector pose and the known location of the high-resolution viewing region, an intermediate pose of the end-effector can be determined. Moving the end-effector to the intermediate pose can result in the small component being moved into the viewing region of the high-resolution 3D camera. The pose of the small component can then be determined using high-resolution information obtained by the high-resolution camera module. In some embodiments, to further improved the positioning efficiency, the system can use machine-learning techniques (e.g., training neural networks) to predict an error matrix that can transform a camera-viewed pose (i.e., the pose of the end-effector or component viewed by either the low-resolution 3D camera module or the high-resolution 3D camera module) to a controller-controlled or desired pose.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A robotic system, the system comprising:
a robotic arm comprising an end-effector;
a robotic controller configured to control movements of the robotic arm; and
a dual-resolution computer-vision system;
wherein the dual-resolution computer-vision system comprises a low-resolution three-dimensional (3D) camera module and a high-resolution 3D camera module; and
wherein the low-resolution 3D camera module and the high-resolution 3D camera module are arranged in such a way that a viewing region of the high-resolution 3D camera module is located inside a viewing region of the low-resolution 3D camera module, thereby allowing the dual-resolution computer-vision system to provide 3D visual information associated with the end-effector in two different resolutions when at least a portion of the end-effector enters the viewing region of the high-resolution camera module.

2. The robotic system of claim 1, wherein the viewing region of the low-resolution 3D camera module is at least ten times larger than the viewing region of the high-resolution 3D camera module.

3. The robotic system of claim 1, wherein the dual-resolution computer-vision system further comprises an arc-shaped supporting frame for mounting the low-resolution 3D camera module and the high-resolution 3D camera module.

4. The robotic system of claim 1, wherein the high-resolution 3D camera module comprises a high-resolution structured-light projector and a pair of high-resolution cameras with a fixed focal length.

5. The robotic system of claim 4, wherein the high-resolution structured-light projector can include a laser source and a telecentric lens system.

6. The robotic system of claim 1, wherein the low-resolution 3D camera module comprises a wide-angle structured-light projector and one or more low-resolution cameras with a fixed focal length.

7. The robotic system of claim 1, further comprising an error-compensation module configured to compensate for pose errors of the robotic arm by determining a controller-desired pose corresponding to a camera-instructed pose of the end-effector such that, when the robotic controller controls the movements of the robotic arm based on the controller-desired pose, the end-effector achieves, as observed by the dual-resolution computer-vision system, the camera-instructed pose.

8. The robotic system of claim 7, wherein the error-compensation module comprises a machine-learning model configured to output an error matrix that correlates the camera-instructed pose to the controller-desired pose.

9. The robotic system of claim 1, further comprising a coordinate-transformation module configured to transform a pose determined by the dual-resolution computer-vision system from a camera-centered coordinate system to a robot-centered coordinate system.

10. The robotic system of claim 9, wherein the coordinate-transformation module is further configured to correlate a pose of a component held by the end-effector to a corresponding pose of the end-effector.

11. A computer-implemented method for controlling movements of a robotic arm comprising an end-effector, the method comprising:

determining, based on visual information provided by a low-resolution three-dimensional (3D) camera module, an initial pose of the end-effector, wherein the low-resolution 3D camera module is part of a dual-resolution computer-vision system comprising the low-resolution 3D camera module and a high-resolution 3D camera module, wherein the low-resolution 3D camera module and the high-resolution 3D camera module are arranged in such a way that a viewing region of the high-resolution 3D camera module is located inside a viewing region of the low-resolution 3D camera module;
determining an intermediate pose of the end-effector based on the initial pose and the viewing region of the high-resolution 3D camera module;
controlling, by a robotic controller, movements of the robotic arm to move the end-effector to the intermediate pose such that a component held by the end-effector enters the viewing region of the high-resolution 3D camera module;
determining a pose of the component based on visual information provided by the high-resolution 3D camera module;
determining a final pose of the end-effector based on the pose of the component; and
controlling movements of the robotic arm to move the end-effector to the final pose.

12. The method of claim 11, wherein the viewing region of the low-resolution 3D camera module is at least ten times larger than the viewing region of the high-resolution 3D camera module.

13. The method of claim 11, wherein the dual-resolution computer-vision system further comprises an arc-shaped supporting frame for mounting the low-resolution 3D camera module and the high-resolution 3D camera module.

14. The method of claim 11, wherein the high-resolution 3D camera module comprises a high-resolution structured-light projector and a pair of high-resolution cameras with a fixed focal length.

15. The method of claim 14 wherein the high-resolution structured-light projector can include a laser source and a telecentric lens system.

16. The method of claim 11, wherein the low-resolution 3D camera module comprises a wide-angle structured-light projector and one or more low-resolution cameras with a fixed focal length.

17. The method of claim 11, wherein controlling movements of the robotic arm to move the end-effector to the final pose further comprises:
determining a controller-desired pose corresponding to the final pose; and
generating and sending motions commands to the robotic arm based on the controller-desired pose.

18. The method of claim 17, wherein determining the controller-desired pose comprises applying a machine-learning model to obtain an error matrix that correlates the final pose to the controller-desired pose.

19. The method of claim 11, wherein determining the final pose further comprises transforming a pose determined by the dual-resolution computer-vision system from a camera-centered coordinate system to a robot-centered coordinate system.

20. The method of claim 19, wherein determining the final pose further comprises transforming a pose of the component held by the end-effector to a corresponding pose of the end-effector.

* * * * *